(12) United States Patent
Sbongk

(10) Patent No.: US 10,323,674 B2
(45) Date of Patent: Jun. 18, 2019

(54) DEVICE FOR FASTENING A COMPONENT TO A CARRIER COMPONENT

(71) Applicant: ILLINOIS TOOL WORKS INC., Glenview, IL (US)

(72) Inventor: Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 110 days.

(21) Appl. No.: 15/026,142

(22) PCT Filed: Sep. 3, 2014

(86) PCT No.: PCT/US2014/053946
§ 371 (c)(1),
(2) Date: Mar. 30, 2016

(87) PCT Pub. No.: WO2015/065583
PCT Pub. Date: May 7, 2015

(65) Prior Publication Data
US 2016/0238058 A1    Aug. 18, 2016

(30) Foreign Application Priority Data

Oct. 30, 2013   (DE) .......................... 10 2013 111 949
Mar. 14, 2014   (DE) .......................... 10 2014 103 535

(51) Int. Cl.
*F16B 37/08*    (2006.01)

(52) U.S. Cl.
CPC ...... *F16B 37/0892* (2013.01); *F16B 37/0842* (2013.01)

(58) Field of Classification Search
CPC ........................... F16B 37/085; F16B 37/0885
(Continued)

(56) References Cited

U.S. PATENT DOCUMENTS 4,828,444 A * 5/1989 Oshida .................. F16B 37/043
411/437
6,050,766 A   4/2000 Kies et al.
(Continued)

FOREIGN PATENT DOCUMENTS

CN      102683905 A   9/2012
DE        3408612 A1   9/1985
(Continued)

OTHER PUBLICATIONS

ISR and WO for PCT/US2014/053946 dated Nov. 21, 2014.

*Primary Examiner* — Gary W Estremsky
(74) *Attorney, Agent, or Firm* — Pilloff & Passino LLP; Martin J. Cosenza

(57) ABSTRACT

The invention relates to a device for fastening a component to a carrier component having a bolt in particular a threaded or grooved bolt or a bolt at least sectionally spherical, comprising an at least sectionally elastic fastening part and a housing part accommodating the fastening part in a mounted state, the housing part and the fastening part having, in the mounted state, an introduction section for introducing the bolt in an introduction direction, at least one latching element for latching on the bolt being provided on an inner wall, bounding the introduction section, of the fastening part, and the fastening part and the housing part each having at least one force transmission surface, the force transmission surfaces facing one another in the mounted state and transmitting at least one tensile force that occurs during operation, the force transmission surfaces each being located in planes which are inclined or curved with respect to the introduction direction of the introduction section such that a tensile force acting on the device generates a force on the fastening part, said force acting radially inwardly with respect to the introduction section.

15 Claims, 6 Drawing Sheets

Figure 1:
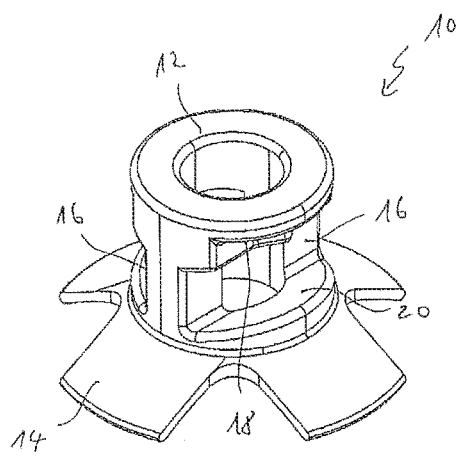

(58) Field of Classification Search
USPC ....... 411/433, 937, 432, 142, 104, 158, 954;
24/629, 653, 666, 694, 656, 48, 607,
24/595.1, 612, 683
See application file for complete search history.

(56) References Cited

U.S. PATENT DOCUMENTS

| | | | | |
|---|---|---|---|---|
| 8,061,945 | B2 * | 11/2011 | Smith | ................ F16B 37/0857 411/267 |
| 8,092,133 | B2 * | 1/2012 | Kosiankowski | ...... F16B 37/005 411/270 |
| 8,272,083 | B1 * | 9/2012 | Liston | ................... E03C 1/0401 137/606 |
| 8,708,629 | B2 * | 4/2014 | Smith | ..................... F16B 39/32 411/267 |
| 8,959,730 | B2 * | 2/2015 | Hemingway | ....... F16B 37/0842 24/291 |
| 9,190,821 | B2 * | 11/2015 | Kwasiborski | ............ H02G 3/32 |
| 2007/0286702 | A1 | 12/2007 | Smith | |
| 2012/0230797 | A1 | 9/2012 | Wallbaum et al. | |

FOREIGN PATENT DOCUMENTS

| | | |
|---|---|---|
| FR | 2751703 A1 | 1/1998 |
| GB | 2155534 B | 10/1987 |
| JP | 2008520934 A | 6/2008 |

\* cited by examiner

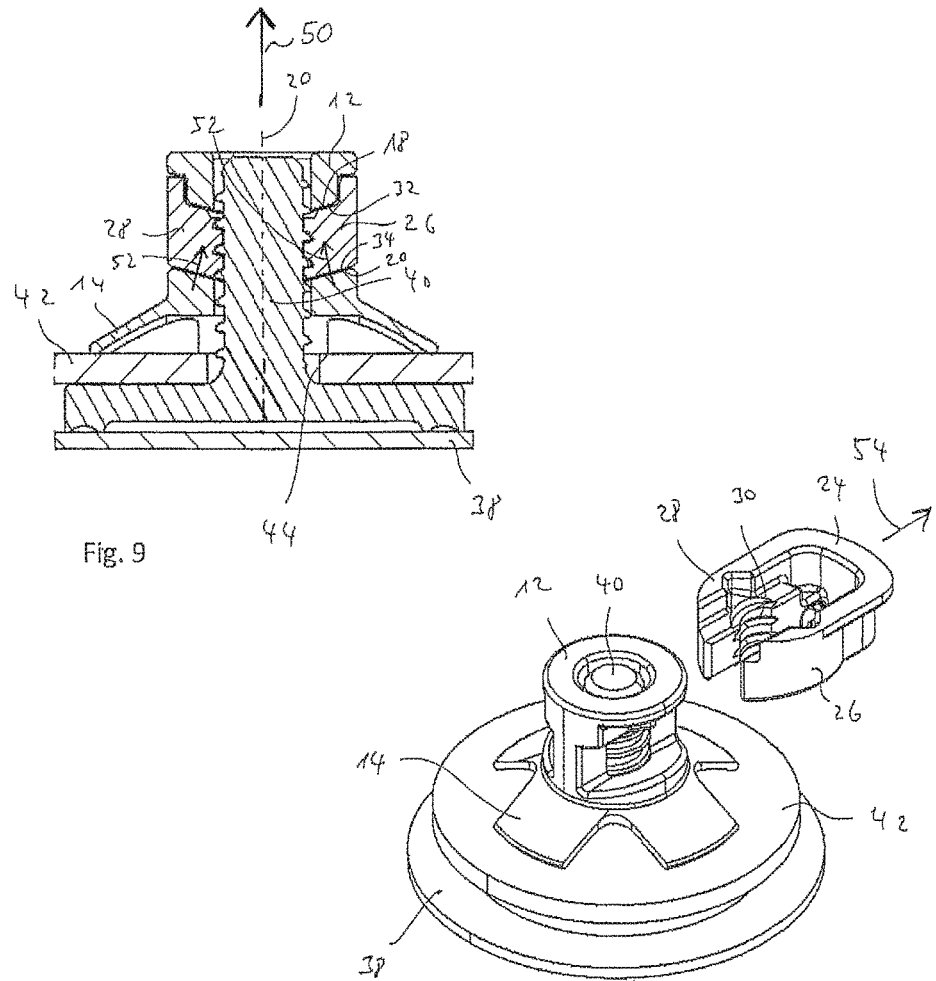
Fig. 9
Fig. 10
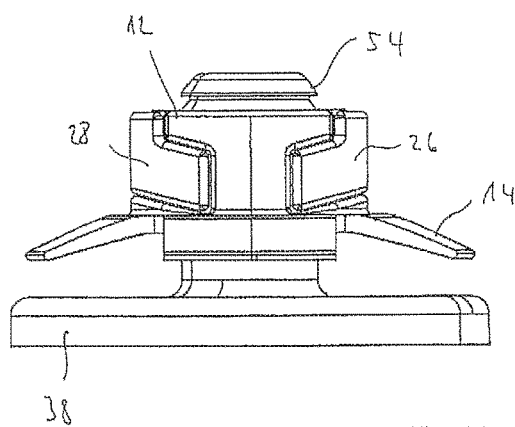
Fig. 11

DEVICE FOR FASTENING A COMPONENT TO A CARRIER COMPONENT

RELATED APPLICATIONS

The present application is a National Phase of International Application Number PCT/US2014/053946 filed Sep. 3, 2014 and claims priority to German Application Numbers DE 10 2013 111 949.2, filed Oct. 30, 2013, and DE 10 2014 103 535.6, filed Mar. 14, 2014.

The invention relates to a device for fastening a component to a carrier component having a bolt. Devices of this type are used, for example in automobile manufacturing, to fasten lining components to body components. DE 34 08 612 A1 discloses a retaining clip for the releasable fastening of components to a threaded bolt. The retaining clip forms an introduction section for the threaded bolt with a plurality of elastic matching elements. For the mounting, the retaining clip can simply be pressed onto the threaded bolt. The threaded bolt has a serrated threaded profile with an upper, flat thread flank and a lower, steep thread flank. This is intended to facilitate the pressing of the retaining clip onto the threaded bolt and to achieve an increased retaining force during operation.

For the removal, the retaining clip has to be unscrewed from the threaded bolt, and this is complicated. Furthermore, it has turned out that the objective conflict between as little mounting force as possible, on the one hand, and as high a retaining force as possible, on the other hand, can be resolved only to a limited extent by means of the adaptation of the threaded profile and the interaction with the elastic latching elements.

Starting from the explained prior art, the invention is based on the object of providing a device of the type mentioned at the beginning, which, with as simple a mounting as possible, as low a mounting force as possible and as high a retaining force as possible during operation, also permits simple removal.

The invention achieves the object by means of the subject matter of claim 1. Advantageous refinements are found in the dependent claims, the description and the figures.

The invention achieves the object by a device for fastening a component to a carrier component having a bolt in particular a threaded or grooved bolt or a bolt at least sectionally spherical, comprising an at least sectionally elastic fastening part and a housing part accommodating the fastening part in a mounted state, the housing part and the fastening part having, in the mounted state, an introduction section for introducing the bolt in an introduction direction, at least one latching element for latching on the bolt being provided on an inner wall, bounding the introduction section, of the fastening part, and the fastening part and the housing part each having at least one force transmission surface, the force transmission surfaces facing one another in the mounted state and transmitting at least one tensile force that occurs during operation, the force transmission surfaces each being located in planes which are inclined or curved with respect to the introduction direction of the introduction section such that a tensile force acting on the device generates a force on the fastening part, said force acting radially inwardly with respect to the introduction section.

The carrier component can be a carrier component which is provided in the interior region or exterior region of an automobile, for example a body component. The component to be fastened to the carrier component can accordingly likewise be a component of an automobile, for example a lining part or an add-on part. The carrier component is provided with a bolt, preferably a threaded or grooved bolt or a bolt which is at least sectionally spherical, which can be connected in basically any way to the carrier component. For example, the bolt can be welded or soldered onto the carrier component. However, it is also possible, for example, to adhesively bond the bolt onto the carrier component. The latter is advantageous in particular when carrier components made from fiber reinforced plastic, for example CFRP carrier components, are used. In the case of a grooved bolt, grooves are formed in the bolt perpendicularly to the axial direction of the bolt and parallel to one another. A grooved profile has the advantage of permitting, in a simple manner, a large thickness tolerance with respect to the components to be fastened to the carrier component. By contrast, in the case of a threaded bolt, a thread having a thread pitch is provided. A bolt which is at least sectionally spherical, for example is completely spherical, can be formed, for example, by a ball which is connected, for example is adhesively bonded or welded, to the carrier component in a suitable manner and which correspondingly forms a ball-type bolt. It is also possible for the bolt to be formed from two or more than two balls or ball sections.

The device according to the invention is formed in two parts with a fastening part and a housing part accommodating the fastening part in a mounted state. In said mounted state, the device is plugged onto the bolt. The housing part together with the fastening part held thereon defines an introduction section, into which the bolt can be introduced. The introduction direction of the introduction section corresponds here as a rule to the axial direction of the, for example, cylindrical bolt. One or more latching elements which latch to the bolt, in particular to the threaded or grooved profile of the threaded or grooved bolt, or to the spherical section of the bolt which is at least sectionally spherical, are formed on one or more of the inner surfaces of the fastening part, which inner surfaces bound the introduction section. The latching elements can likewise be formed, for example, by grooves or threads. However, other latching elements are also conceivable, for example elastic latching tongues or the like. The device can be plugged or pressed in a simple manner by means of the introduction section thereof onto the bolt. The device therefore does not have to be screwed onto the bolt, for example onto a threaded or grooved bolt.

Furthermore, the fastening part and the housing part each have one or more force transmission surfaces which interact during operation of the device. During operation, i.e. when the component is fastened to the carrier component by the device, the force transmission surfaces transmit forces acting on the device, for example tensile forces, compressive forces or the like. The force transmission surfaces here in particular do not take part in the latching of the bolt in the introduction section. In the mounted state of the device, the force transmission surfaces of the fastening part and of the housing part are in contact, or are at least so close to one another that they are in contact with one another when forces occur during operation, and then transmit said forces. A tensile force which occurs during operation and is transmitted by the force transmission surfaces is directed here counter to the introduction direction of the bolt. A compressive force is correspondingly directed in the introduction direction of the bolt.

According to the invention, the force transmission surfaces of the fastening part and housing part are located in planes which are inclined or curved with respect to the introduction direction of the introduction section. For example, in the case of inclined planes, an angle between the introduction direction and the plane is correspondingly greater than 0° and smaller than 90°. Such an angle can be, for example, within a range between 65° and 85°. The arrangement according to the invention of the force transmission surfaces in planes which are inclined or curved with respect to the introduction direction results in a tensile force acting on the device during operation generating a force on the fastening part, said force acting radially inwardly with respect to the introduction section. When a tensile force occurs, the fastening part is therefore pressed radially inwardly against the bolt. The tensile force therefore increases the retaining force of the device. It is thereby possible, with acceptable mounting forces in relation to known devices, to achieve an increased retaining force during operation. In order to carry out the abovementioned function, the fastening part is at least sectionally, in particular completely, elastic. The fastening part and/or the housing part can be composed of a plastic. In particular, the fastening part and/or the housing part can be produced, for example, in a plastics injection molding process. The production is thereby simplified and the elasticity required for operating the device is realized. The device according to the invention is distinguished by cost-effective production and universal usability. Low mounting forces and high retaining forces are achieved along with simple mounting. Furthermore, the device according to the invention is removable simply in a manner which is to be explained in more detail below and is reusable after removal.

The mounting force is reduced further if, owing to the force transmission surfaces which are located in planes which are inclined or curved with respect to the introduction direction, a compressive force acing on the device, in particular during the course of the mounting, generates a force on the fastening part, said force acting radially outwardly with respect to the introduction section. While a tensile force presses the fastening part further onto the bolt during operation and therefore increases the retaining force, this refinement results in the fastening part expanding when a compressive force occurs during the pressing of the bolt into the introduction section, and therefore the bolt can be introduced and latched in the introduction section with a particularly low force.

According to a further refinement, it can be provided that the housing part and the fastening part each have at least two force transmission surfaces formed on opposite sides of the introduction section. The force transmission surfaces can each be located in planes which are inclined or curved in a mirrored manner to one another in relation to the introduction direction of the introduction section. The force transmission surfaces of the housing part, on the one hand, and of the fastening part, on the other hand, are each arranged at the same height with respect to the introduction direction. They run mirror-symmetrically to one another with respect to a mirror plane running through the longitudinal axis of the introduction section. A particularly uniform mounting and retaining force is achieved during operation by means of this refinement.

According to another refinement, it can be provided that the housing part and the fastening part each have at least two force transmission surfaces that are spaced apart in the introduction direction of the introduction section and are each located in planes which are inclined or curved with respect to the introduction direction of the introduction section. The force transmission surfaces, spaced apart in the introduction direction of the introduction section, of the fastening part and of the housing part can each be located, in particular in pairs, in planes that are parallel to one another. In this refinement, the fastening part and the housing part therefore each have at least two force transmission surfaces which are offset with respect to one another in the introduction direction. A force transmission surface of one part of the device always interacts here with a corresponding force transmission surface of the other part of the device. The retaining forces are further improved by means of this refinement. A combination of this refinement with the refinement explained above, in which the housing part and the fastening part each have two mirror-inverted force transmission surfaces formed on opposite sides of the introduction section, is also possible. In this case, the fastening part and the housing part therefore each have at least four force transmission surfaces.

According to a further, particularly practical refinement, the fastening part can comprise a connecting section and two elastic arm sections extending from the connecting section, said elastic arm sections engaging around the housing part in a clip-like manner in the mounted state. The housing part can have two recesses, in each case one arm section being received in one of the recesses in the mounted state. In this refinement, the fastening part therefore forms an elastic fastening clip which engages around the housing part in a clip-like manner in the mounted state. The elastic arm sections of the fastening part can be slightly bent upward for the fastening to the housing part. During the subsequent springing back into the inoperative position thereof, said arm sections can then be received, for example in a form-fitting manner, in the recesses of the housing part, for example can engage behind corresponding retaining sections of the housing part. The fastening part can be formed in particular in a U-shaped manner. The abovementioned refinement of the fastening part in the form of a fastening clip further facilitates the mounting, and in particular also the removal, of the device according to the invention. In the mounted state of the fastening part in which the latter is accommodated in the housing part, the device can be pressed onto the bolt in a simple manner. In order to remove the device and therefore the component fastened to the carrier component, the fastening part, which is in the form of a clip, can be pulled off from the housing part in the radial direction with respect to the bolt in a particularly simple manner. This can take place by the arm sections being slightly bent upward. During the course of this removal, the latching elements formed on the fastening part are also disengaged from the bolt. Consequently, the housing part can subsequently simply be pulled off from the bolt. The removal takes place in a destruction-free manner and without wear-susceptible loading, and therefore the device can easily be reused. For this purpose, the clip-like fastening part merely has to be inserted again into the recesses of the housing part in order to produce the mounted state again.

In this respect, a further advantageous refinement makes provision for in each case at least one, preferably in each case at least two, force transmission surfaces that are located in planes which are inclined or curved with respect to the introduction direction of the introduction section to be formed on the recesses, and for likewise in each case at least one, preferably in each case at least two, force transmission surfaces that are located in planes which are inclined or curved with respect to the introduction direction of the introduction section to be formed on the arm sections. The recesses of the housing part can each have a force transmission surface on the top side and bottom side thereof, said force transmission surfaces being located in a plane which, in particular, is inclined with respect to the introduction direction of the introduction section. The arm sections of the fastening part then have corresponding force transmission surfaces on the top sides and bottom sides thereof. Force transmission surfaces of the fastening part and of the housing part that face one another and interact in order to transmit force can be located, in turn, in particular in pairs, in mutually parallel planes. The latching elements for latching on the bolt can be formed, in particular, on opposing inner surfaces of the arm sections. As already explained, the latching elements can be formed, for example, by an internal threaded profile or internal grooved profile or else by a toothing or the like.

According to a further refinement, the housing part can have, at its end forming an introduction opening of the introduction section, at least one elastic abutment section which, when a component is fastened to the carrier component, abuts against a surface of the component fastened to the carrier component. For example, a flange-like abutment section can be involved. It is also possible for a plurality of abutment sections, for example four such abutment sections, to be provided. The component is held between the at least one abutment section and the upper side of the carrier component during operation. The retaining forces are increased by the resiliently elastic design of the abutment section or abutment sections.

According to an alternative refinement, the housing part can be formed integrally on the component to be fastened to the carrier component. Whereas, in the case of the refinements explained above, the fastening part and the housing part are separate parts from the carrier component and the component to be fastened thereto, in this refinement the housing part is part of the component to be fastened to the carrier component. This refinement can be used in particular at locations to which access is difficult in the interior of automobiles. The housing part can furthermore form a pocket accommodating the fastening part in the mounted state. Again, at least the fastening part is at least sectionally elastic, preferably completely elastic. Of course, as in the refinements above, the housing part can also be sectionally or completely elastic. The housing part and/or the fastening part can again be composed of a plastic, produced, for example, in a plastics injection molding process.

According to a further refinement, the fastening part can be accommodated in the pocket with play in the mounted state. This permits removal by the bolt being pulled with increased force out of the introduction section. In the process, because of the movement play existing in particular perpendicularly to the introduction direction, the fastening part can yield, and therefore the latching of the latching elements to the bolt is released and the bolt can be pulled out.

The fastening part can be formed in an annularly closed manner, in each case latching elements for latching on the bolt being formed on two mutually opposing ring sections. The top and bottom sides of the ring sections having the latching elements can form, in turn, force transmission surfaces that are located in planes which are inclined or curved with respect to the introduction direction of the introduction section.

Figure 2:
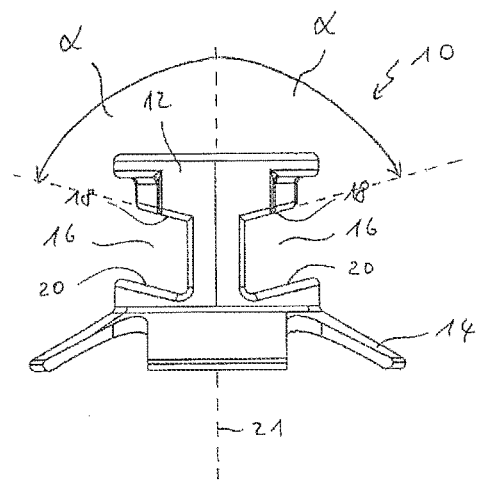
Figure 3:
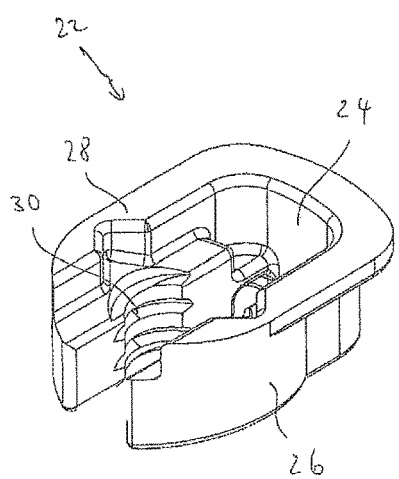
Figure 4:
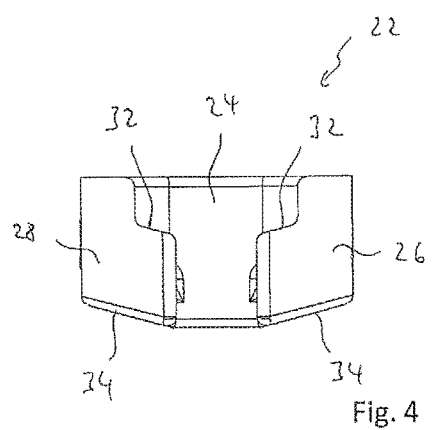
Figure 5:
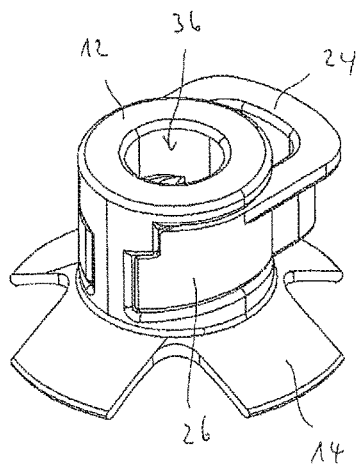
Figure 6:
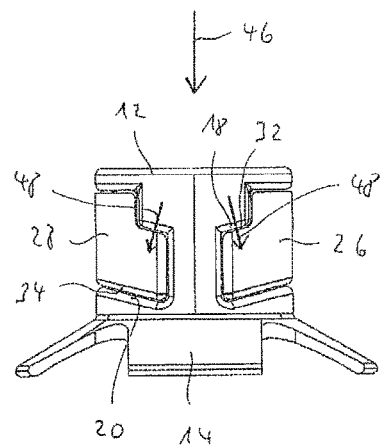
Figure 7:
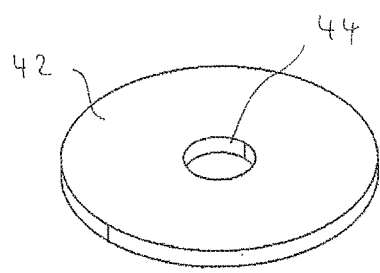
Figure 7:
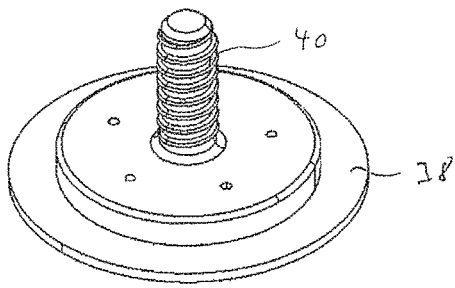
Figure 8:
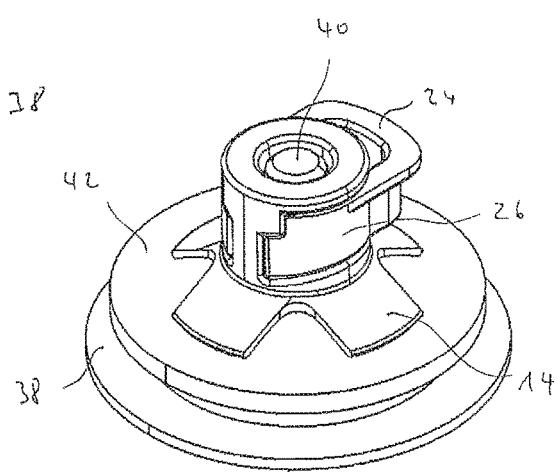
Figure 12:
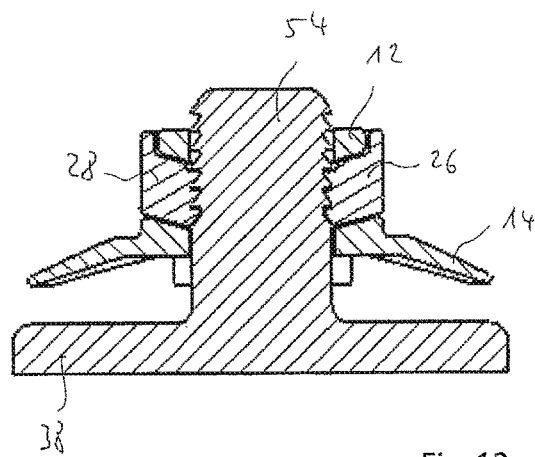
Figure 13:
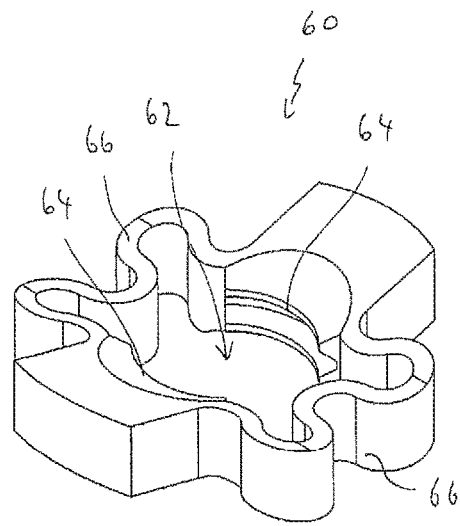
Figure 14:
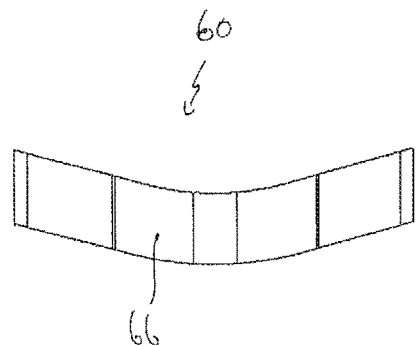
Figure 15:
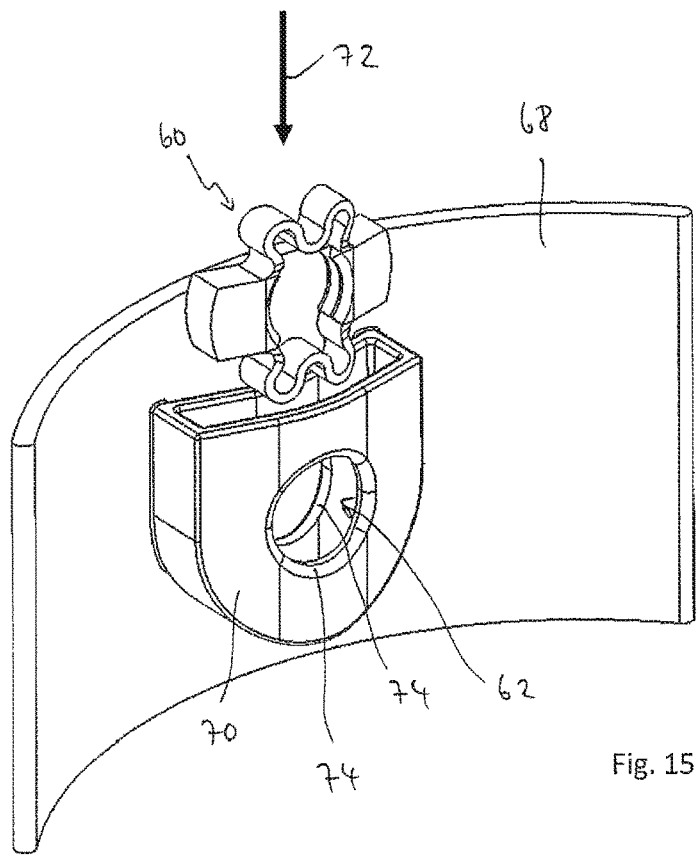
Figure 16:
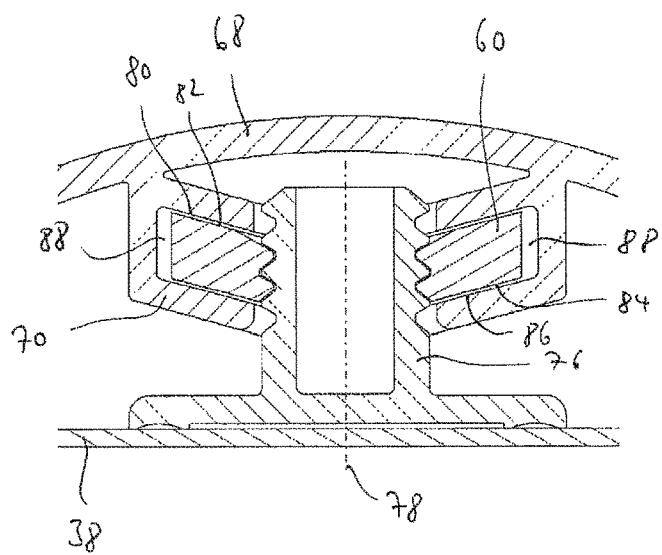
Figure 17:
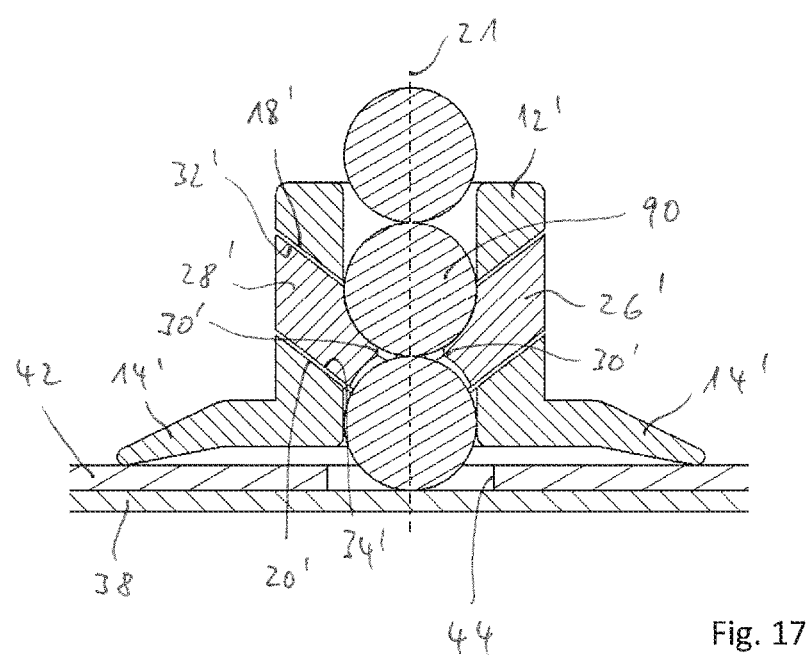

Exemplary embodiments of the invention are explained in more detail below with reference to figures, in which, schematically:

FIG. 1 shows a housing part of a first exemplary embodiment of a device according to the invention in a perspective view, FIG. 2 shows the housing part from FIG. 1 in a side view, FIG. 3 shows a fastening part of a first exemplary embodiment of a device according to the invention in a perspective view, FIG. 4 shows the fastening part from FIG. 3 in a side view, FIG. 5 shows the housing part from FIG. 1 and the fastening part from FIG. 3 in a mounted state in a perspective view, FIG. 6 shows the housing part from FIG. 1 and the fastening part from FIG. 3 in the mounted state in a side view, FIG. 7 shows part of a carrier component and of a component to be fastened thereto, in a perspective view, FIG. 8 shows the component which is fastened to the carrier component by the device according to the invention shown in FIG. 5, in a perspective view, FIG. 9 shows a vertical sectional view of the illustration in FIG. 8, FIG. 10 shows a removal state of the first exemplary embodiment of the device according to the invention in a perspective view, FIG. 11 shows a further exemplary embodiment of a device according to the invention in a side view, FIG. 12 shows a vertical sectional view of the illustration from FIG. 11, FIG. 13 shows a fastening part of a further exemplary embodiment of a device according to the invention in a perspective view, FIG. 14 shows the fastening part from FIG. 13 in a side view, FIG. 15 shows a device according to the invention with the fastening part from FIG. 13 in a pre-mounted state in a perspective view, FIG. 16 shows a component fastened to a carrier component by the device shown in FIG. 15, in a sectional view, and FIG. 17 shows a sectional view as in FIG. 9 according to a further exemplary embodiment.

Unless stated otherwise, identical reference numbers in the figures denote identical objects. FIGS. 1 and 2 show a housing part 10 of a first exemplary embodiment of a device according to the invention. The housing part 10 has a substantially hollow-cylindrical section 12 which, in a manner to be explained in more detail below, together with a fastening part forms an introduction section for a bolt, in particular a threaded bolt or grooved bolt, or a bolt which is at least sectionally spherical. At the lower end, in FIGS. 1 and 2, forming the entrance of the introduction section, the housing part 10, in the example shown, has four elastic abutment sections 14 which are formed during operation for the purpose of resting in a resiliently elastic manner on a top side of a component to be fastened to a carrier component. In the example shown, the housing part 10 has two recesses 16 in which the fastening part is accommodated in a manner yet to be explained below. The top sides and the bottom sides of the recesses 16 in each case form force transmission surfaces 18, 20. As can be seen in particular in FIG. 2, the upper force transmission surfaces 18 in FIG. 2 are each located in planes which are arranged obliquely with respect to the bolt introduction direction running along the axial direction 21 of the hollow-cylindrical section 12, in each case at an angle α in the example shown in FIG. 2. In the example shown, the angle α is in each case approx. 75°. The lower force transmission surfaces 20 are located in planes parallel to the planes of the upper force transmission surfaces 18, and therefore said lower force transmission surfaces are likewise arranged at the angle α in relation to the introduction direction. Furthermore, it can be seen in FIG. 2 that the force transmission surfaces 18 and 20 formed on opposite sides of the introduction section, which is formed by the hollow-cylindrical section 12, are each formed in a mirror-inverted manner with respect to a mirror plane running through the axial direction 21, and running perpendicularly into the plane of the drawing in FIG. 2.

FIGS. 3 and 4 illustrate a fastening part 22 according to the invention. The fastening part 22 has a connecting section 24 and two elastic arm sections 26, 28 extending from the connecting section 24. A plurality of latching elements 30 is formed in each case on the mutually opposite inner sides of the elastic arm sections 26, 28. In the example shown, the latching elements 30 are internal threads which are each formed in sections. As can furthermore be seen in particular in FIG. 4, force transmission surfaces 32, 34 are in each case formed on the top sides and bottom sides of the elastic arm sections 26, 28. The force transmission surfaces 32, 34 correspond to the force transmission surfaces 18, 20 of the housing part. In particular, the force transmission surfaces 32, 34 of the fastening part 22 are also located in planes which are inclined with respect to the introduction direction of the introduction section, again at the angle α.

FIGS. 5 and 6 show the mounted state of the housing part 10 shown in FIGS. 1 and 2 and of the fastening part 22 shown in FIGS. 3 and 4. In order to reach the mounted state, the fastening part 22 has been pushed radially with respect to the axial direction 21 by the arm sections 26, 28 thereof into the recesses 16. The arm sections 26, 28 here can be retained in a form-fitting manner at the recesses 16 of the housing part 10. In this mounted state, the force transmission surfaces 18, 20 of the housing part 10 are in contact with the force transmission surfaces 32, 34, which face them, of the fastening part 22, as can be seen in particular in FIG. 6. The introduction section which is defined in said mounted state by the housing part 10 and the fastening part 22 and is intended for a bolt is shown at the reference number 36 in FIG. 5.

FIG. 7 shows, highly schematically, at reference number 38, a carrier component of an automobile, for example a body part. In the example shown, a threaded bolt 40 is fastened on the body part 38, for example by welding, soldering or adhesive bonding. In addition, a component 42 to be fastened to the carrier part 38 is shown highly schematically in FIG. 7 at reference number 42. Said component has a central through bore 44 with which said component can be pushed over the threaded bolt 40. The device shown in FIGS. 5 and 6 is subsequently pressed onto the threaded bolt 40 into the operating position shown in FIG. 8. The latching elements 30 of the fastening part 22 match here to the thread of the threaded bolt 40. The abutment sections 14 rest on the top side of the component 42, The effect of a compressive force occurring during the course of the mounting of the device on the threaded bolt will be explained by way of example with reference to FIG. 6. The compressive force is indicated in FIG. 6 by the arrow 46. Said compressive force is transmitted via the force transmission surfaces 18, 32 and the force transmission surfaces 20, 34. The forces resulting in the process are indicated for the force transmission surfaces 18, 32 in FIG. 6 by arrows 48. Owing to the inclined arrangement of the force transmission surfaces 18, 32, the transmitted forces 48 have a radially outwardly directed component. This results in a force acting radially outwardly on the arm sections 26, 28 of the fastening part 22 and therefore in a slight expansion of the arm sections 26, 28. As a result, the pressing of the device onto the threaded bolt 40 is facilitated.

The occurrence of a tensile force, which is indicated at reference number 50, during operation will be explained by way of example with reference to FIG. 9. The tensile force 50 is, in turn, transmitted by the force transmission surfaces 18, 32 and 20, 34. The inclined arrangement of the force transmission surfaces in turn results in a force component which, in this case, acts radially inwardly in relation to the introduction direction, as indicated by way of example for the lower force transmission surfaces 20, 34 by the arrows 52 in FIG. 9. The arm sections 26, 28 are therefore pressed further against the threaded bolt 40, and therefore the retaining force is increased.

For removal, the fastening part 22 can be pulled off radially outwardly from the housing part 10 in a simple manner, as indicated by the arrow 54 in FIG. 10. In the process, the latching elements 30 are also disengaged from the threaded bolt 40, and therefore the device and the component 42 can subsequently be pulled off from the threaded bolt 40.

FIGS. 11 and 12 illustrate a further exemplary embodiment which substantially corresponds to the exemplary embodiment explained in FIGS. 1 to 10. In contrast thereto, the top side of the hollow-cylindrical section 12 of the housing part 10 has been somewhat shortened and the device has been pressed onto a grooved bolt 54. For representation reasons, the component which is to be fastened to the carrier component 38 is not shown here.

A further exemplary embodiment will be explained with reference to FIGS. 13 to 16. FIGS. 13 and 14 illustrate a fastening part 60. The latter is formed in an annularly closed manner and bounds an introduction section 62 for a bolt, in particular a threaded or grooved bolt or a bolt which is at least sectionally spherical. Latching elements 64 for latching on a bolt, in the present case in the form of a threaded or grooved section, are formed on two mutually opposing ring sections of the fastening part 60. The remaining opposing ring sections 66 are curved in an undulating manner and are elastic. FIG. 15 shows a component to be fastened to a carrier component at reference number 68. A pocket-shaped housing part 70, into which the fastening part 60 can be inserted, as indicated by the arrow 72 in FIG. 15, is formed integrally on said component. The housing part 70 has apertures 74, and therefore, in the assembled mounted state, the fastening part 60 and the housing part 70 together form the introduction section 62 for a bolt. FIG. 16 highly schematically shows a carrier component 38 to which, in this case, a grooved bolt 76 is fastened, for example by welding, soldering, adhesive bonding or the like. In order to fasten the component 68 to the carrier component 38, the grooved bolt 76 has been pressed into the introduction section 62, with the grooved profile of the grooved bolt 76 latching on the latching elements 64. Force transmission surfaces 80, 82, 84, 86 of the fastening part 60 and of the housing part 70, which force transmission surfaces are located in oblique planes in relation to the introduction direction of the grooved bolt 76, the introduction direction running along the axial direction 78 of the introduction section, are again provided. A tensile force which occurs during operation and then endeavors to pull the grooved bolt 76 out of the introduction section again results, owing to the inclined arrangement of the force transmission surfaces 80, 82, 84, 86, in further compression of the fastening element 60 against the grooved bolt 76, and therefore in an increased retaining force.

For removal, the grooved bolt 76 can be pulled with an increased removal force, with the latching being released, out of the introduction section. It can be seen in FIG. 16 that a distance 88 is formed in each case between the outer sides of the fastening part 60 and the inner sides of the housing part 70, and therefore the fastening part 60 is accommodated in the housing part 70 with play in the radial direction with respect to the axis 78. During the course of the grooved bolt 76 being pulled out, the fastening part 60 can therefore yield radially outwardly, and therefore the latching can be released.

FIG. 17 shows a vertical sectional view similar to FIG. 9. In this exemplary embodiment, a ball-type bolt 90, which is formed from three balls in the example shown, is connected to the carrier component 38. It goes without saying that the three balls of the ball-type bolt 90 are connected integrally to one another, in a manner produced, for example, by cold deformation or welding. The fastening part of the device according to the invention that is shown in FIG. 17 also has two elastic arm sections 26', 28', on the opposite inner sides of which a latching element 30' is in each case formed, said latching element being retained in a latching manner between the two lower balls of the hall-type bolt 90. The housing part of the device according to the invention that is shown in FIG. 17 again has a substantially hollow-cylindrical section 12' which forms an introduction section for the ball-type bolt 90. Furthermore, in the example shown, four elastic abutment sections 14', which rest in a resiliently elastic manner on the top side of the component 42, are again provided. In an analogous manner as for the device shown in FIG. 9, upper and lower force transmission surfaces 18', 20' are also provided for the device shown in FIG. 17, said force transmission surfaces each being located in planes which are arranged in an inclined manner with respect to the introduction direction of the ball-type bolt 90, said introduction direction running along the axial direction 21 of the hollow-cylindrical section 12'. Force transmission surfaces 32', 34', which correspond to the force transmission surfaces 18', 20' of the housing part, are correspondingly again formed on the top sides and bottom sides of the elastic arm sections 26', 28' of the fastening part. In particular, the force transmission surfaces 32', 34' of the fastening part are located in planes which are inclined in relation to the introduction direction of the introduction section for the ball-type bolt 90, specifically at the same angle as the force transmission surfaces 18', 20' of the housing part. The mounting and the function of the device according to the invention that is shown in FIG. 17 corresponds to the mounting and the function of the device shown, for example, with reference to FIGS. 1 to 10, except for the configuration of the ball-type bolt 90 and the associated latching elements 30'.

The invention claimed is:

1. A device for fastening a component to a carrier component having a threaded, or grooved, or sectionally spherical bolt, comprising a sectionally elastic fastening part and a housing part accommodating the fastening part in a mounted state, the housing part and the fastening part having, in the mounted state, an introduction section for introducing the bolt in an introduction direction, at least one latching element for latching on the bolt being provided on an inner wall, bounding the introduction section, of the fastening part, and the fastening part and the housing part each having at least one force transmission surface, the force transmission surfaces facing one another in the mounted state and transmitting at least one tensile force that occurs during operation, the force transmission surfaces each being located in planes which are inclined or curved with respect to the introduction direction of the introduction section such that a tensile force acting on the device generates a force on the fastening part, said force acting radially inwardly with respect to the introduction section, wherein the fastening part comprises a connecting section and two elastic arm sections extending from the connecting section, said elastic arm sections engaging the housing part in a clip-like manner in the mounted state.

2. The device as claimed in claim 1, wherein a compressive force acting on the device generates a force on the fastening part, said force acting radially outwardly with respect to the introduction section.

3. The device as claimed in claim 1, wherein the housing part and the fastening part each have at least two force transmission surfaces formed on opposite sides of the introduction section.

4. The device as claimed in claim 1, wherein the housing part and the fastening part each have at least two force transmission surfaces that are spaced apart in the introduction direction of the introduction section and are each located in planes which are inclined or curved with respect to the introduction direction of the introduction section.

5. The device as claimed in claim 4, wherein the force transmission surfaces, spaced apart in the introduction direction of the introduction section, of the fastening part and of the housing part are each located in planes that are parallel to one another.

6. The device as claimed in claim 1, wherein said elastic arm sections engaging around the housing part in a clip-like manner in the mounted state.

7. The device as claimed in claim 6, wherein the housing part has two recesses, in each case one arm section being received in one of the recesses in the mounted state.

8. The device as claimed in claim 7, wherein in each case at least one, preferably in each case at least two, force transmission surfaces that are located in planes which are inclined or curved with respect to the introduction direction of the introduction section are formed on the recesses, and wherein likewise in each case at least one, preferably in each case at least two, force transmission surfaces that are located in planes which are inclined or curved with respect to the introduction direction of the introduction section are formed on the arm sections.

9. The device as claimed in claim 6, wherein latching elements for latching on the bolt are formed on the opposing inner surfaces of the arm sections.

10. The device as claimed in claim 1,
wherein the housing part has, at its end forming an introduction opening of the introduction section, at least one elastic abutment section which, when a component is fastened to the carrier component, abuts against a surface of the component fastened to the carrier component.

11. The device as claimed in claim 1, wherein the housing part is connected integrally to the component to be fastened to the carrier component.

12. The device as claimed in claim 11, wherein the housing part forms a pocket accommodating the fastening part in the mounted state.

13. The device as claimed in claim 12, wherein the fastening part is accommodated in the pocket with play in the mounted state.

14. A device for fastening a component to a carrier component having a threaded, or grooved, or sectionally spherical bolt, comprising a sectionally elastic fastening part and a housing part accommodating the fastening part in a mounted state, the housing part and the fastening part having, in the mounted state, an introduction section for introducing the bolt in an introduction direction, at least one latching element for latching on the bolt being provided on an inner wall, bounding the introduction section, of the fastening part, and the fastening part and the housing part each having at least one force transmission surface, the force transmission surfaces facing one another in the mounted state and transmitting at least one tensile force that occurs during operation, the force transmission surfaces each being located in planes which are inclined or curved with respect to the introduction direction of the introduction section such that a tensile force acting on the device generates a force on the fastening part, said force acting radially inwardly with respect to the introduction section, wherein the fastening part is formed in an annularly closed manner as part of single component, in each case latching elements for latching on the bolt being formed on two mutually opposing ring sections which are elastically urged towards and onto the bolt by structure establishing the annularly closed manner.

15. The device as claimed in claim 14, wherein the top and bottom sides of the ring sections having the latching elements form force transmission surfaces that are located in planes which are inclined or curved with respect to the introduction direction of the introduction section.

\* \* \* \* \*